(12) United States Patent
Reed et al.

(10) Patent No.: US 8,064,863 B1
(45) Date of Patent: Nov. 22, 2011

(54) IMAGE REJECTION CALIBRATION

(75) Inventors: David Reed, Westminster, CO (US);
Nadim Khlat, Midi-Pyrenees (FR)

(73) Assignee: RF Micro Devices, Inc., Greensboro, NC (US)

( * ) Notice: Subject to any disclaimer, the term of this patent is extended or adjusted under 35 U.S.C. 154(b) by 455 days.

(21) Appl. No.: 12/371,018

(22) Filed: Feb. 13, 2009

Related U.S. Application Data

(60) Provisional application No. 61/028,590, filed on Feb. 14, 2008.

(51) Int. Cl.
*H04B 1/18* (2006.01)
*H04B 1/10* (2006.01)

(52) U.S. Cl. .................... 455/285; 455/67.11

(58) Field of Classification Search ............ 455/285, 455/302, 226.1, 67.11, 296
See application file for complete search history.

(56) References Cited

U.S. PATENT DOCUMENTS

| | | | |
|---|---|---|---|
| 7,299,021 B2 * | 11/2007 | P rssinen et al. | 455/226.1 |
| 7,477,881 B2 * | 1/2009 | Kim | 455/130 |
| 7,580,680 B2 * | 8/2009 | Isaac et al. | 455/67.11 |
| 7,636,588 B2 * | 12/2009 | Lee et al. | 455/574 |
| 2007/0080835 A1 * | 4/2007 | Maeda et al. | 341/120 |

* cited by examiner

*Primary Examiner* — Quan Tra
(74) *Attorney, Agent, or Firm* — Withrow & Terranova, P.L.L.C.

(57) ABSTRACT

The present invention relates to image rejection calibration in a radio frequency (RF) receiver. In one embodiment, the receiver includes a receiver front-end and an image rejection calibration system. The image rejection calibration system provides a first test signal to an RF input of the receiver front-end, and obtains first measurements of a quadrature output signal output from the receiver front-end while the first test signal is applied to the RF input. The image rejection calibration system then applies a second test signal to the RF input of the receiver front-end that is approximately 90 degrees out-of-phase with the first test signal, and obtains second measurements of the quadrature output signal while the second test signal is applied to the RF input. Based on the first and second measurements, the image rejection calibration system determines an amplitude error and a phase error of the receiver front-end.

21 Claims, 9 Drawing Sheets

IMAGE REJECTION CALIBRATION

This application claims the benefit of provisional patent application Ser. No. 61/028,594, filed Feb. 14, 2008, the disclosure of which is hereby incorporated herein by reference in its entirety.

FIELD OF THE DISCLOSURE

The present invention relates to a radio frequency receiver, and more particularly relates to image rejection calibration in a radio frequency receiver.

BACKGROUND

In a heterodyne architecture, a received signal is downconverted to an intermediate frequency (IF), rather than to baseband, for signal processing using a mixing operation. One inherent problem in heterodyne receivers is that when downconverting the received signal to the desired intermediate frequency, an image of the received signal is also converted to the desired intermediate frequency as a result of the mixing operation. More specifically, because the mixing operation does not preserve the polarity of the difference between its two input frequencies, the receive frequency and the image frequency, which are located at an equal distance from either side of a local oscillator (LO) frequency used in the mixing operation, are translated to the same IF frequency. Since power of the image signal may not be regulated and can be much higher than that of the desired signal, image rejection must be performed.

In order to provide image rejection, many heterodyne receivers utilize a quadrature architecture. More specifically, the received signal is downconverted to the desired intermediate frequency using a quadrature mixing operation. However, achievable image rejection of such quadrature architectures is limited by the amount of I/Q mismatch in the receiver. As such, there is a need for a system and method of correcting I/Q mismatch in a heterodyne receiver in order to improve image rejection.

SUMMARY OF THE DETAILED DESCRIPTION

The present invention relates to image rejection calibration in a radio frequency receiver. In one embodiment, the receiver includes a receiver front-end and an image rejection calibration system. The image rejection calibration system provides a first test signal to a radio frequency (RF) input of the receiver front-end, and obtains first measurements of a quadrature output signal output from the receiver front-end while the first test signal is applied to the RF input. The image rejection calibration system then applies a second test signal to the RF input of the receiver that is approximately 90 degrees out-of-phase with the first test signal, and obtains second measurements of the quadrature output signal output from the receiver front-end while the second test signal is applied to the RF input. Based on the first and second measurements, the image rejection calibration system determines an amplitude error and a phase error of the receiver front-end. The image rejection calibration system then applies an amplitude correction and a phase correction to the receiver front-end to correct for the amplitude error and the phase error of the receiver front-end. As a result of applying the approximately 90 degree phase shift between the first test signal and the second test signal, the amplitude and phase errors of the receiver front-end are separated from amplitude and phase errors of the image rejection calibration system. As a result, the amplitude correction corrects for the amplitude error of the receiver front-end rather than a combined amplitude error of the receiver front-end and the image rejection calibration system, and the phase correction corrects for the phase error of the receiver front-end rather than a combined phase error of the receiver front-end and the image rejection calibration system.

In another embodiment, the receiver includes a receiver front-end having a first stage and a second stage interconnected via a polyphase filter. In addition, the receiver includes an image rejection calibration system. In order to provide image rejection calibration, the image rejection calibration system applies a first test signal to an RF input of the receiver front-end, where an image of the first test signal is at a frequency within a high attenuation frequency zone of the polyphase filter. The image rejection calibration system obtains first measurements of a quadrature output signal output from the receiver front-end while the first test signal is applied to the RF input of the receiver front-end. The image rejection calibration system then applies a second test signal that is approximately 90 degrees out-of-phase with the first test signal to the RF input of the receiver front-end. Like the image of the first test signal, the image of the second test signal is at a frequency within a high-attenuation frequency zone of the polyphase filter. The image rejection calibration system obtains second measurements of the quadrature signal output from the receiver front-end while the second test signal is applied to the RF input. Since the images of the first and second test signals are located within the high-attenuation frequency zone of the polyphase filter, the first and second measurements are indicative of an amplitude error and a phase error of the second stage of the receiver front-end.

Next, the polyphase filter is set to a bypass mode. The image rejection calibration system obtains measurements of the quadrature output signal output from the receiver front-end while two test signals that are approximately 90 degrees out-of-phase are applied to the RF input of the receiver front-end, and determines an amplitude error and phase error of the first stage based on these measurements and the measurements indicative of the amplitude error and the phase error of the second stage. The image rejection calibration system then applies an amplitude correction and a phase correction to the first stage. Optionally, the image rejection calibration system may also apply corrections for the amplitude and phase errors of the second stage or provide the amplitude and phase errors of the second stage to a digital processor for correction.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Figure 1:
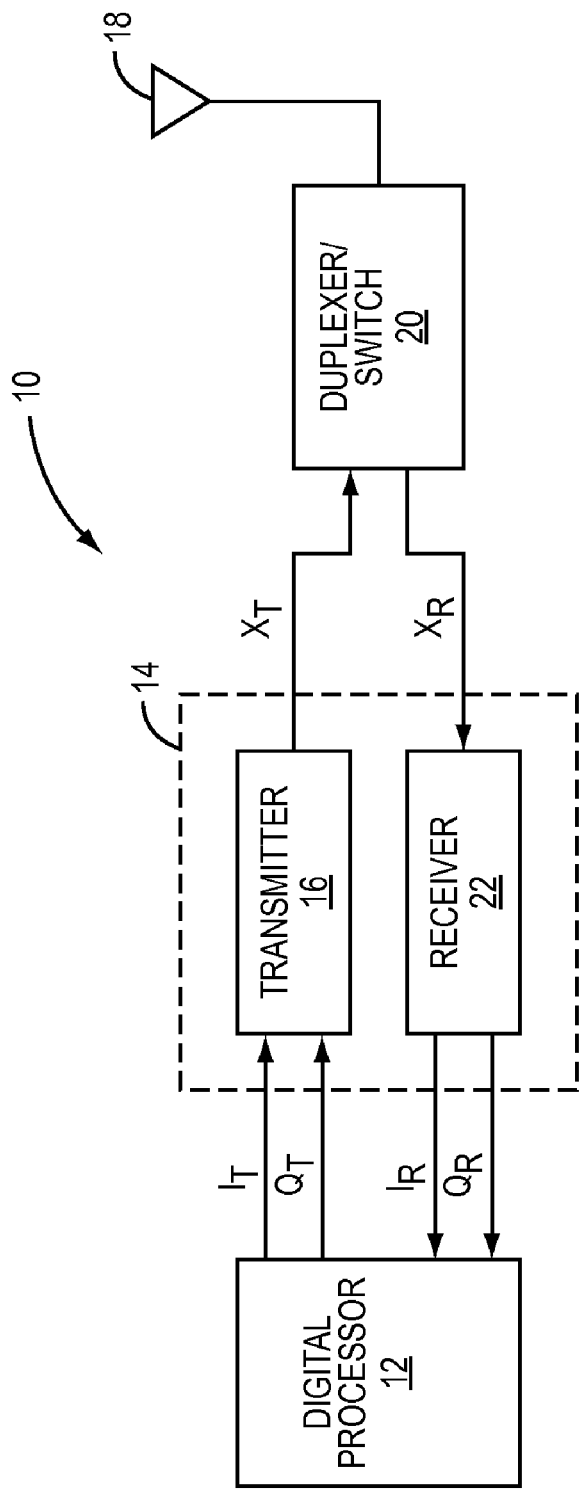
FIG. 1 illustrates a radio frequency transceiver including a receiver having an image rejection calibration system according to one embodiment of the present invention.

The present invention relates to image rejection calibration for a radio frequency (RF) receiver. Before further discussing the present invention, it is beneficial to discuss inherent I/Q mismatch errors of a typical transceiver 10 illustrated in FIG. 1. The transceiver 10 can be partitioned into a digital processor 12 and a radio section 14. In the radio section 14, a transmitter 16 receives transmit signals ($I_T$ and $Q_T$) from the digital processor 12 and outputs a corresponding RF transmit signal ($X_T$) to an antenna 18 via a duplexer or switch 20. The radio section 14 also includes a receiver 22 that receives a received RF signal ($X_R$) from the antenna 18 and outputs corresponding receive signals ($I_R$ and $Q_R$) to the digital processor 12.

A modulated signal can be expressed as the weighted sum of two orthogonal carriers:

$$X(t)=I(t)\cos(\omega_c t)-Q(t)\sin(\omega_c t), \quad (1)$$

where $\omega_c$ is the carrier frequency, t is time, and the weighting functions I(t) and Q(t) are the orthogonal components. In the transceiver 10, the transmitter 16 includes a modulator, which generates the RF transmit signal ($X_T$) from orthogonal baseband transmit signals ($I_T$) and ($Q_T$), and the receiver 22 includes a demodulator, which generates the orthogonal downconverted receive signals ($I_R$) and ($Q_R$) from the received RF signal ($X_R$). Thus, for an ideal transceiver 10:

$$X_T(t)=I_T(t)\cos(\omega_c t)-Q_T(t)\sin(\omega_c t); \text{ and} \quad (2)$$

$$X_R(t)=I_R(t)\cos(\omega_c t+\theta)-Q_R(t)\sin(\omega_c t+\theta), \quad (3)$$

where θ is a phase offset between the transmit and receive carriers $\omega_c$, which is unimportant in normal operation. For a non-ideal transceiver 10:

$$X_T(t)=I'_T(t)\cos(\omega_c t)-Q'_T(t)\sin(\omega_c t); \text{ and} \quad (4)$$

$$X_R(t)=I'_R(t)\cos(\omega_c t+\theta)-Q'_R(t)\sin(\omega_c t+\theta), \quad (5)$$

where $I'_T$ and $Q'_T$ are the inputs to an ideal transmitter that would generate the same RF transmit signal ($X_T$) as the non-ideal transceiver 10, and $I'_R$ and $Q'_R$ are the outputs of an ideal receiver for the same RF received signal ($X_R$) as the non-ideal transceiver 10. Deviations from ideal behavior are attributable partly to noise and non-linearity in the transceiver 10, and partly to other effects that are associated with mismatches between nominally identical sections of the signal path.

The present invention relates to calibration of the receiver 22 for the mismatch errors resulting in an amplitude, or gain, error ($a_R$) causing the in-phase receive signal ($I_R$) to be amplified by a factor of $1+a_R$ relative to the quadrature-phase receive signal ($Q_R$) and a phase error ($\theta_R$) causing the phase difference between the nominally orthogonal signals to be $90°+\theta_R$. In a receiver without calibration, amplitude and phase errors of up to 0.3 decibels (dB) and 3° can occur.

Figure 2:
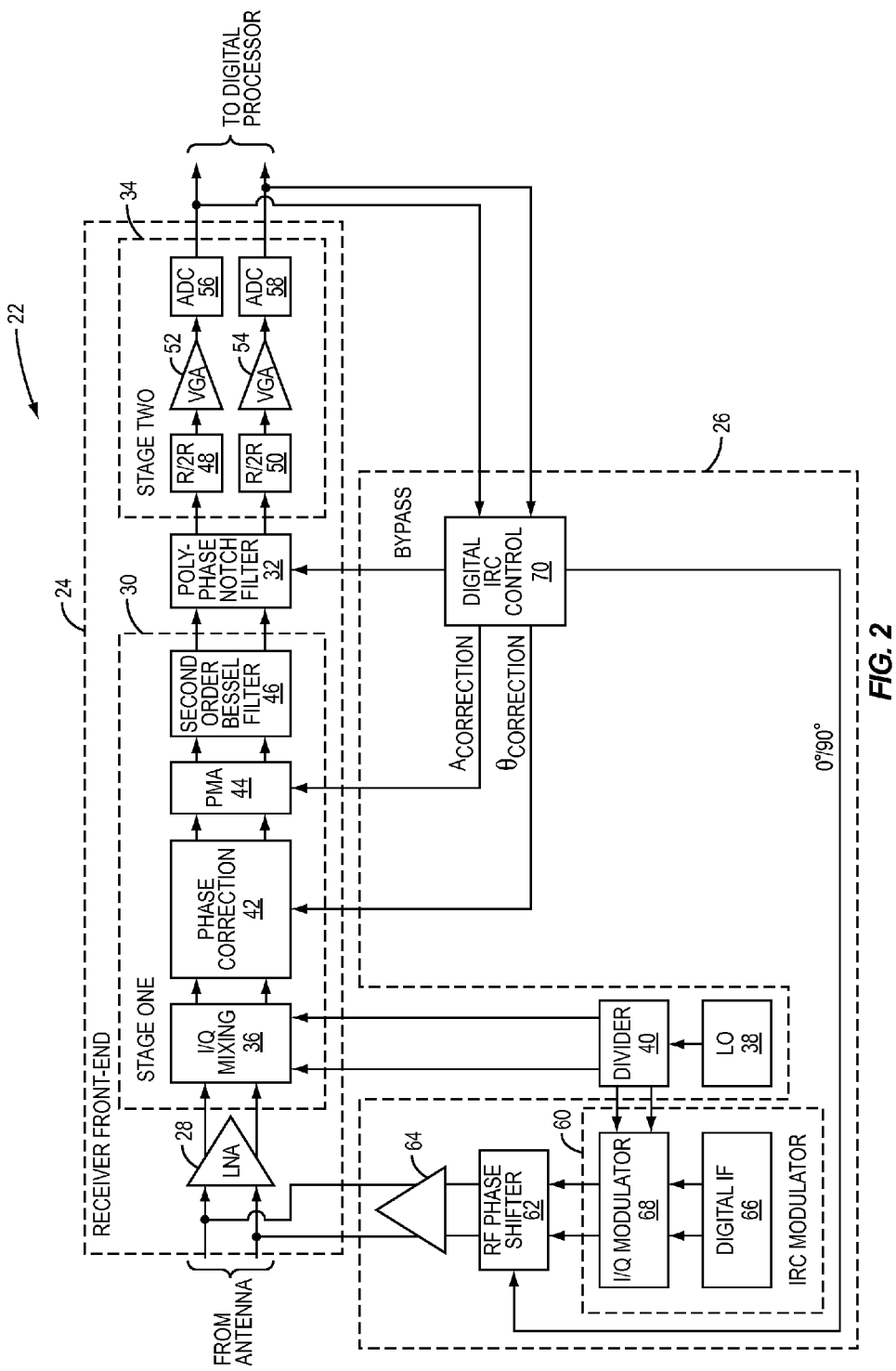
FIG. 2 is a block diagram of the receiver of FIG. 1 wherein the receiver includes an image rejection calibration system according to one embodiment of the present invention.

FIG. 2 illustrates the receiver 22 according to one embodiment of the present invention. In this embodiment, the receiver 22 includes a receiver front-end 24 and an image rejection calibration (IRC) system 26 that performs image rejection calibration according to one embodiment of the present invention. Before discussing the details of the receiver front-end 24, it should be noted that the receiver front-end 24 illustrated in FIG. 2 is exemplary and is not intended to limit the scope of the present invention. The particular implementation of the receiver front-end 24 may vary depending on numerous variables such as the particular communications standard being utilized for transmission and reception.

The receiver front-end 24 includes a low noise amplifier (LNA) 28, a first stage 30, a polyphase notch filter 32, and a second stage 34 connected as shown. In this embodiment, the first stage 30 includes I/Q mixing circuitry 36 that operates to downconvert an amplified received signal output by the LNA 28 to a desired very low intermediate frequency (VLIF) using two substantially orthogonal local oscillator (LO) signals from a LO generation circuit to provide a quadrature output signal at the VLIF. The LO generation circuit is formed by a LO 38 and a divider 40. Note that the while in this embodiment the receiver 22 is a VLIF receiver, the present invention is not limited thereto. For instance, the receiver 22 may alternatively downconvert the received signal to baseband. The quadrature output signal output by the I/Q mixing circuitry 36 passes through a phase correction circuit 42, which operates to provide a phase correction under control of the IRC system 26 as described below. A post mixing amplifier (PMA) 44 then amplifies the output of the phase correction circuit 42. An amplitude correction ($A_{CORRECTION}$) is applied to vary a gain of the PMA 44 to correct for an amplitude error determined by the IRC system 26. The output of the PMA 44 is then filtered by a second order Bessel filter 46 to provide a quadrature output signal of the first stage 30 of the receiver front-end 24.

In this embodiment, the quadrature output signal from the first stage 30 is then filtered by a polyphase filter, which in this embodiment is the polyphase notch filter 32. Note that the polyphase notch filter 32 is exemplary. Other types of polyphase filters may be used. Also, as used herein, a polyphase filter is a filter having different responses for a main signal and an image of that main signal such that the image is attenuated with respect to the main signal.

The output of the polyphase notch filter 32 is provided as a quadrature input signal to the second stage 34 of the receiver front-end 24. In this embodiment, the second stage 34 of the receiver front-end 24 includes R/2R networks 48 and 50, variable gain amplifiers (VGAs) 52 and 54, and analog-to-digital converters (ADCs) 56 and 58 connected as shown. Note that the illustrated embodiments of the first and second stages 30 and 34 of the receiver front-end 24 are exemplary. As will be appreciated by one of ordinary skill in the art, the receiver front-end 24 may vary depending on the particular implementation. Further, while in this embodiment the receiver front-end 24 includes the first and second stages 30 and 34 that are separated by the polyphase notch filter 32, the present invention is not limited thereto. In another embodiment, the receiver front-end 24 may not include a polyphase filter dividing the receiver front-end 24 into two stages.

The IRC system 26 includes an IRC modulator 60 that provides a modulated signal to an RF phase shifter 62. The RF phase shifter 62 has two states that are approximately 90 degrees apart. For image rejection calibration, the output of the RF phase shifter 62 is provided to an RF input of the receiver front-end 24 via an injection amplifier 64 as a test signal. In this embodiment, the RF input of the receiver front-end 24 is the input of the LNA 28. The IRC modulator 60 includes digital intermediate frequency (IF) circuitry 66 and an I/Q modulator 68. The digital IF circuitry 66 operates to generate in-phase and a quadrature-phase analog signals at the VLIF of the receiver 22. In one embodiment, the in-phase and quadrature-phase analog signals are square wave signals. The I/Q modulator 68 upconverts the in-phase and quadrature-phase analog signals from the digital IF circuitry 66 to the RF frequency of the receiver 22 using, in this embodiment, the same LO signals used by the receiver front-end 24, and then combines the upconverted in-phase and quadrature-phase signals to provide the modulated signal to be output to the RF phase shifter 62. The modulated signal output by the IRC modulator 60 is a single side-band signal. In the embodiment discussed below, the modulated signal is an upper side-band signal. However, in another embodiment, the modulated signal may be a lower side-band signal. Further, the IRC modulator 60 may be controllable to provide either the upper side-band or lower side-band signal as desired by controlling the phasing of the in-phase and quadrature-phase analog signals output by the digital IF circuitry 66.

In addition, the IRC system 26 includes digital IRC control circuitry 70, which controls the IRC modulator 60 and the RF phase shifter 62 to provide test signals to the RF input of the receiver front-end 24, measures amplitude and phase errors of a quadrature output signal output by the receiver front-end 24 via the ADCs 56 and 58, determines amplitude and phase errors of the receiver front-end 24, and applies correction factors to correct for the amplitude and phase errors of the receiver front-end 24, as discussed below. Notably, by utilizing the RF phase shifter 62, the digital IRC control circuitry 70 is enabled to separate the amplitude and phase errors of the receiver front-end 24 from amplitude and phase errors of the IRC modulator 60. As a result, the correction factors applied by the digital IRC control circuitry 70 correct for the amplitude and phase errors of the receiver front-end 24 rather than combined amplitude and phase errors of the receiver front-end 24 and the IRC modulator 60. Further, by being enabled to separate the amplitude and phase errors of the receiver front-end 24 from the amplitude and phase errors of the IRC modulator 60, the IRC modulator 60 may be a non-ideal, relatively low power digital modulator without adversely affecting the accuracy of the image rejection calibration process.

Figure 3:
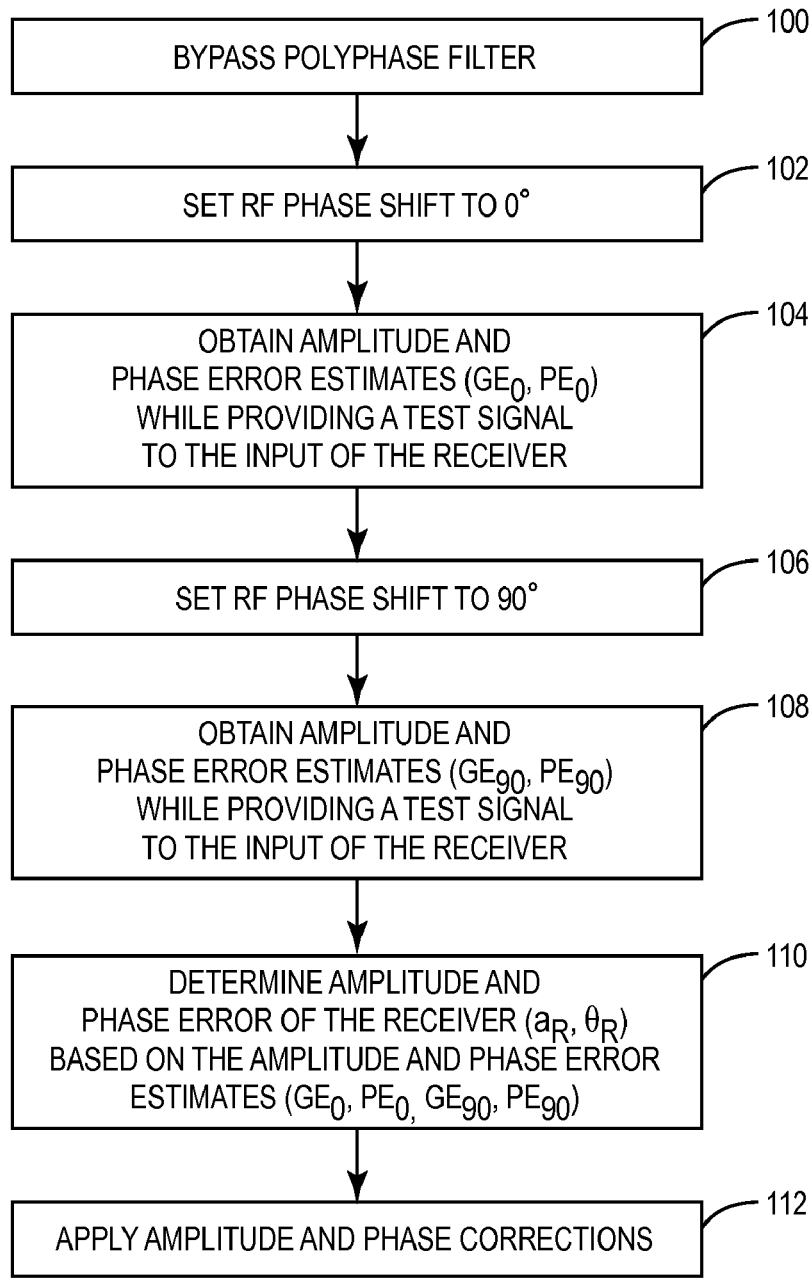
FIG. 3 is a flow chart illustrating the operation of the image rejection calibration system of FIG. 2 according to one embodiment of the present invention.

FIG. 3 is a flow chart illustrating the operation of the IRC system 26 of FIG. 2 according to one embodiment of the present invention. While this process is discussed with respect to the particular embodiment of the receiver 22 illustrated in FIG. 2, the present invention is not limited thereto. The IRC system 26 may be utilized in any type of quadrature receiver. First, the digital IRC control circuitry 70 sets the polyphase notch filter 32 to a bypass mode (step 100). Of course, for embodiments where the receiver 22 does not include a polyphase filter dividing the receiver front-end 24 into two stages, step 100 is not needed. Next, the digital IRC control circuitry 70 sets a phase shift of the RF phase shifter 62 to zero degrees (step 102). Note that while phase shifts of 0 and 90 degrees are discussed herein, the RF phase shifter 62 may use any two phase shifts that are approximately 90 degrees apart. Further, due to a phase error of the RF phase shifter 62, the 90 degree phase shift has an error, which in an exemplary embodiment is ±4 degrees.

Once the RF phase shift is set to zero degrees, the digital IRC control circuitry 70 obtains a first amplitude (or gain) error estimate ($GE_0$) and a first phase error estimate ($PE_0$) based on measurements of a quadrature output signal ($I_R$, $Q_R$) output by the receiver front-end 24 while a first test signal is applied to the RF input of the receiver front-end 24 by the IRC modulator 60 and the RF phase shifter 62 (step 104). The digital IRC control circuitry 70 then sets the phase shift of the RF phase shifter 62 to 90 degrees (step 106). Once the RF phase shift is set to 90 degrees, the digital IRC control circuitry 70 obtains a second amplitude error estimate ($GE_{90}$) and a second phase error estimate ($PE_{90}$) based on measurements of the quadrature output signal ($I_R$, $Q_R$) output by the receiver front-end 24 while a second test signal that is approximately 90 degrees out-of-phase with the first test signal is applied to the RF input of the receiver front-end 24 (step 108). The digital IRC control circuitry 70 then determines an amplitude error ($a_R$) and a phase error ($\theta_R$) of the receiver front-end 24 based on the first and second amplitude error estimates ($GE_0$ and $GE_{90}$) and the first and second phase error estimates ($PE_0$ and $PE_{90}$) (step 110) and applies corresponding amplitude and phase corrections ($A_{CORRECTION}$ and $\theta_{CORRECTION}$) to the receiver front-end 24 (step 112).

As discussed below in detail, by utilizing the RF phase shifter 62 to provide a phase shift of approximately 90 degrees between the first and second test signals and by obtaining the amplitude and phase error estimates for both the first and second test signals, the digital IRC control circuitry 70 is enabled to separate the amplitude error ($a_R$) of the receiver front-end 24 from any amplitude error of the IRC modulator 60 and separate the phase error ($\theta_R$) of the receiver front-end 24 from any phase error of the IRC modulator 60. As a result, the IRC system 26 corrects for the amplitude error ($a_R$) of the receiver front-end 24 rather than a combined amplitude error of the receiver front-end 24 and the IRC modulator 60. Likewise, the IRC system 26 corrects for the phase error ($\theta_R$) of the receiver front-end 24 rather than a combined phase error of the receiver front-end 24 and the IRC modulator 60.

The following discussion mathematically describes the operation of the IRC system 26 and how the IRC system 26 is enabled to separate the amplitude error ($a_R$) and the phase error ($\theta_R$) of the receiver front-end 24 from the amplitude error and the phase error of the IRC modulator 60. First, the following variables are defined:

$a_T$=amplitude (or gain) error of the IRC modulator 60;
$\theta_{T1}$=phase error of the IRC modulator 60;
$\theta_{T2}$=phase error of the LO system used by the IRC modulator 60;
$a_R$=amplitude (or gain) error of the receiver front-end 24;
$\theta_R$=phase error of the receiver front-end 24; and
$\theta$=phase error to 90 degrees of the RF phase shifter 62.

Further, let the following variables $\epsilon$ and $\alpha$ be defined as:

$$\epsilon = a_T - j(\theta_{T2} - \theta_{T1}); \text{ and} \quad (6)$$

$$\alpha = 2 + a_T + j(\theta_{T2} + \theta_{T1}). \quad (7)$$

Note that these equations for $\epsilon$ and $\alpha$ assume that the IRC modulator 60 provides an upper side-band signal. Similar equations can be used if the IRC modulator 60 instead provides a lower side-band signal by replacing $j(\theta_{T2} - \theta_{T1})$ with $j(\theta_{T2} + \theta_{T1})$ in the equation for $\epsilon$ and replacing $j(\theta_{T2} + \theta_{T1})$ with $j(\theta_{T2} - \theta_{T1})$ in the equation for $\alpha$.

By modeling the IRC modulator 60 with the above imperfections, four complex terms that depend on the phase shift of the RF phase shifter 62 can be defined as:

$$I_0 = -je^{-j\theta} \cdot \epsilon + \alpha \text{ for a phase shift of 0 degrees;} \quad (8)$$

$$Q_{90} = -je^{j\theta} \cdot \epsilon + \alpha \text{ for a phase shift of 90 degrees;} \quad (9)$$

$$I_{90} = je^{j\theta} \cdot \epsilon + \alpha \text{ for a phase shift of 90 degrees; and} \quad (10)$$

$$Q_0 = je^{-j\theta} \cdot \epsilon + \alpha \text{ for a phase shift of 0 degrees.} \quad (11)$$

The measurements of the quadrature output signal output from the receiver front-end 24 when the RF phase shifter 62 is set to 0 degrees may then be defined as:

$$I_R \cdot e^{-j\omega t} |_0 = \frac{(1+a_R)}{2} \cdot e^{-j\theta_R} \cdot I_0; \text{ and} \quad (12)$$

$$Q_R \cdot e^{-j\omega t} |_0 = \frac{1}{2} \cdot Q_0. \quad (13)$$

Similarly, the measurements of the quadrature output signal output from the receiver front-end 24 when the RF phase shifter 62 is set to 90 degrees may then be defined as:

$$I_R \cdot e^{-j\omega t} |_{90} = \frac{(1+a_R)}{2} \cdot e^{-j\theta_R} \cdot I_{90}; \text{ and} \quad (14)$$

$$Q_R \cdot e^{-j\omega t} |_{90} = \frac{1}{2} \cdot Q_{90}. \quad (15)$$

Using the measurements of the quadrature output signal from the receiver front-end 24 defined by equations (12) through (15), the digital IRC control circuitry 70 may then determine the amplitude error ($a_R$) of the receiver front-end 24 based on the equation:

$$a_R \cong \frac{\text{abs}(I_R \cdot e^{-j\omega t} |_0)}{\text{abs}(Q_R \cdot e^{-j\omega t} |_{90})}, \quad (16)$$

where the function abs( ) returns an amplitude or magnitude of a complex term.

However, in the preferred embodiment, the digital IRC control circuitry 70 determines the amplitude error ($a_R$) of the receiver front-end 24 by first determining amplitude, or gain, error estimates using the measurements of the quadrature output signal output by the receiver front-end 24 based on the following equations:

$$GE_0 = 1 - \frac{\text{abs}(Q_R \cdot e^{-j\omega t} |_0)}{\text{abs}(I_R \cdot e^{-j\omega t} |_0)}; \text{ and} \quad (17)$$

$$GE_{90} = 1 - \frac{\text{abs}(Q_R \cdot e^{-j\omega t} |_{90})}{\text{abs}(I_R \cdot e^{-j\omega t} |_{90})}, \quad (18)$$

where $GE_0$ is an amplitude error estimate for the test signal at a phase shift of 0 degrees and $GE_{90}$ is an amplitude error estimate for the test signal at a phase shift of 90 degrees. Then, using equations (17) and (18), the amplitude error ($a_R$) of the receiver front-end 24 may be estimated as:

$$a_R \cong \frac{GE_0 + GE_{90}}{2}. \quad (19)$$

In a similar manner, the digital IRC control circuitry 70 may determine the phase error ($\theta_R$) of the receiver front-end 24 based on the following equations:

$$PE_0 = \text{ang}(I_R \cdot e^{-j\omega t} |_0) - \text{ang}(Q_R \cdot e^{-j\omega t} |_0); \text{ and} \quad (20)$$

$$PE_{90} = \text{ang}(I_R \cdot e^{-j\omega t} |_{90}) - \text{ang}(Q_R \cdot e^{-j\omega t} |_{90}) \quad (21)$$

where $PE_0$ is a phase error estimate for the test signal at a phase shift of 0 degrees and $PE_{90}$ is a phase error estimate for the test signal at a phase shift of 90 degrees. The function ang( ) returns a phase of a complex term. Using equations (20) and (21), the phase error ($\theta_R$) of the receiver front-end 24 may be estimated as:

$$\theta_R \cong \frac{1}{2} \cdot (PE_0 + PE_{90}). \quad (22)$$

Figure 4:
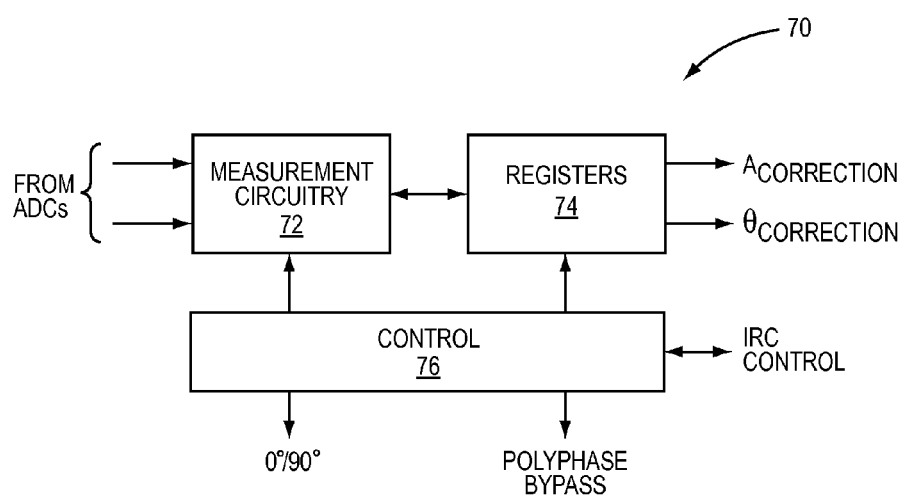
FIG. 4 is a block diagram of digital image rejection calibration control circuitry of the image rejection calibration system of FIG. 2 according to one embodiment of the present invention.

FIG. 4 is a more detailed block diagram of the digital IRC control circuitry 70 of FIG. 2 according to one embodiment of the present invention. As illustrated, the digital IRC control circuitry 70 includes measurement circuitry 72, registers 74, and control circuitry 76. The measurement circuitry 72 operates under the control of the control circuitry 76 to obtain measurements of the in-phase and quadrature-phase components of the quadrature output signal from the receiver front-end 24 (FIG. 2) while the test signals are being applied to the RF input of the receiver front-end 24. In the embodiment discussed above, the measurement circuitry 72 obtains the measurements of the in-phase and quadrature-phase components of the quadrature output signal from the receiver front-end 24 while the test signals are being applied to the RF input of the receiver front-end 24 and outputs corresponding amplitude and phase error estimates ($GE_0$, $GE_{90}$, $PE_0$, $PE_{90}$). Based on the output of the measurement circuitry 72, the control circuitry 76 determines the amplitude error ($a_R$) and the phase error ($\theta_R$) of the receiver front-end 24. The control circuitry 76 then provides the amplitude error ($a_R$) and the phase error ($\theta_R$) of the receiver front-end 24 to the registers 74 such that corresponding amplitude and phase corrections ($A_{CORRECTION}$ and $\theta_{CORRECTION}$) are applied to the receiver front-end 24. In one embodiment, the registers 74 store a look-up table including amplitude and phase correction values for different amplitude and phase error values.

Figure 5:
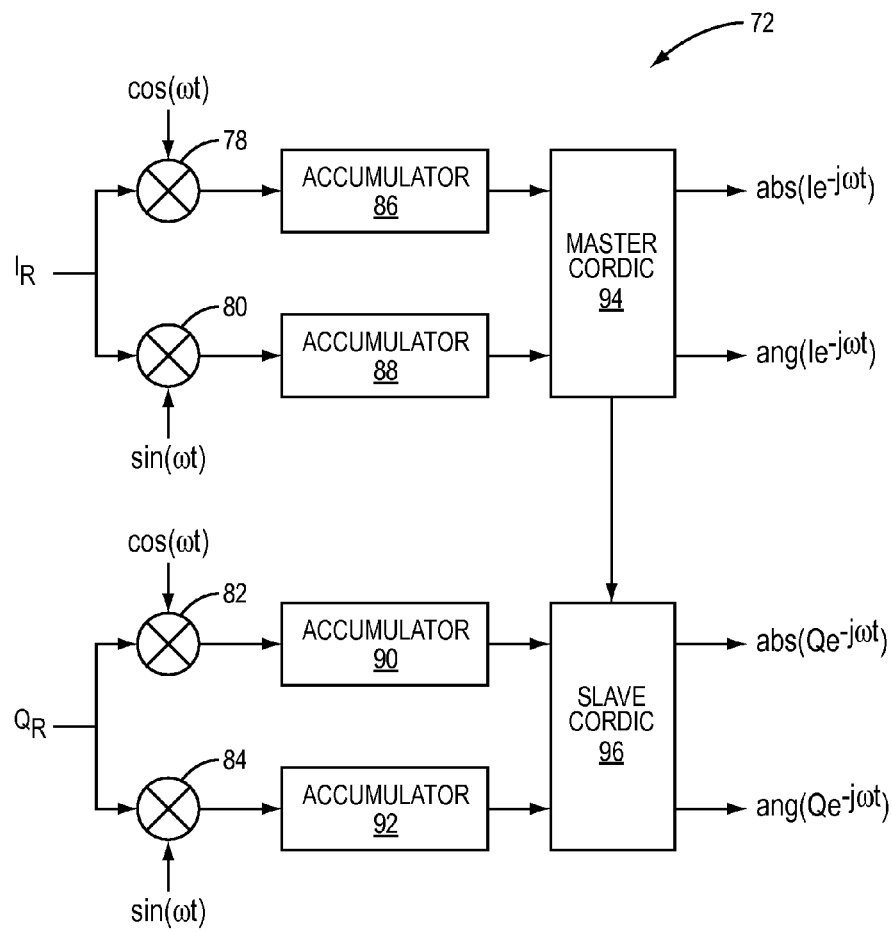
FIG. 5 is a block diagram of measurement circuitry of the digital image rejection calibration control circuitry according to one embodiment of the present invention.

FIG. 5 is a more detailed block diagram of the measurement circuitry 72 of FIG. 4 according to one embodiment of the present invention. In this embodiment, the measurement circuitry 72 includes multipliers 78 through 84, accumulators 86 through 92, and two coordinate rotation digital computers (CORDICs) 94 and 96 designated as a master CORDIC 94 and a slave CORDIC 96. In operation, while the first test signal having the first phase shift, which in this example is 0 degrees, is applied to the RF input of the receiver front-end 24, the multipliers 78 and 80 multiply the digital in-phase component ($I_R$) of the quadrature output signal from the receiver front-end 24 (FIG. 2) with sine and cosine functions, respectively, and the accumulators 86 and 88 accumulate the outputs of the multipliers 78 and 80, respectively. Note that the outputs of the accumulators 86 and 88 provide a measured estimate of the term $I_R \cdot e^{-j\omega t}|_0$ defined above in equation (12) in response to the first test signal having the first phase shift of approximately 0 degrees. The master CORDIC 94 then processes the outputs of the accumulators 86 and 88 to provide a magnitude measurement of the term $I_R \cdot e^{-j\omega t}|_0$ and a phase measurement of the term $I_R \cdot e^{-j\omega t}|_0$, which are denoted as $\text{abs}(I_R \cdot e^{-j\omega t}|_0)$ and $\text{ang}(I_R \cdot e^{-j\omega t}|_0)$ in equations (16) through (18), (20), and (21) above.

In addition, while the first test signal having the first phase shift, which in this example is 0 degrees, is applied to the RF input of the receiver front-end 24, the multipliers 82 and 84 multiply the digital quadrature-phase component ($Q_R$) of the quadrature output signal from the receiver front-end 24 (FIG. 2) with sine and cosine functions, respectively, and the accumulators 90 and 92 accumulate the outputs of the multipliers 82 and 84, respectively. Note that the outputs of the accumulators 90 and 92 in response to the test signal having the first phase shift of approximately 0 degrees provide a measured estimate of the term $Q_R \cdot e^{-j\omega t}|_0$ defined above in equation (13). The slave CORDIC 96 then processes the outputs of the accumulators 90 and 92 to provide a magnitude measurement of the term $Q_R \cdot e^{-j\omega t}|_0$ and a phase measurement of the term $Q_R \cdot e^{-j\omega t}|_0$, which are denoted as $\text{abs}(Q_R \cdot e^{-j\omega t}|_0)$ and $\text{ang}(Q_R \cdot e^{-j\omega t}|_0)$ in equations (16) through (18), (20), and (21) above.

Likewise, while the second test signal having the second phase shift, which in this example is 90 degrees, is applied to the RF input of the receiver front-end 24, the multipliers 78 and 80 multiply the digital in-phase component ($I_R$) of the quadrature output signal from the receiver front-end 24 (FIG. 2) with sine and cosine functions, respectively, and the accumulators 86 and 88 accumulate the outputs of the multipliers 78 and 80, respectively. Note that the outputs of the accumulators 86 and 88 in response to the second test signal having the second phase shift of approximately 90 degrees provide a measured estimate of the term $I_R \cdot e^{-j\omega t}|_{90}$ defined above in equation (14). The master CORDIC 94 then processes the outputs of the accumulators 86 and 88 to provide a magnitude measurement of the term $I_R \cdot e^{-j\omega t}|_{90}$ and a phase measurement of the term $I_R \cdot e^{-j\omega t}|_{90}$, which are denoted as $\text{abs}(I_R \cdot e^{-j\omega t}|_{90})$ and $\text{ang}(I_R \cdot e^{-j\omega t}|_{90})$ in equations (16) through (18), (20), and (21) above.

In addition, while the second test signal having the second phase shift, which in this example is 90 degrees, is applied to the RF input of the receiver front-end 24, the multipliers 82 and 84 multiply the digital quadrature-phase component ($Q_R$) of the quadrature output signal from the receiver front-end 24 (FIG. 2) with sine and cosine functions, respectively, and the accumulators 90 and 92 accumulate the outputs of the multipliers 82 and 84, respectively. Note that the outputs of the accumulators 90 and 92 in response to the test signal having the first phase shift of approximately 90 degrees provide a measured estimate of the term $Q_R \cdot e^{-j\omega t}|_{90}$ defined above in equation (15). The slave CORDIC 96 then processes the outputs of the accumulators 90 and 92 to provide a magnitude measurement of the term $Q_R \cdot e^{-j\omega t}|_{90}$ and a phase measurement of the term $Q_R \cdot e^{-j\omega t}|_{90}$, which are denoted as $\text{abs}(Q_R \cdot e^{-j\omega t}|_{90})$ and $\text{ang}(Q_R \cdot e^{-j\omega t}|_{90})$ in equations (16) through (18), (20), and (21) above.

Using the outputs of the master and slave CORDICs 94 and 96, the control circuitry 76 (FIG. 4) is enabled to determine the amplitude error ($a_R$) of the receiver front-end 24 based on equation (16) or equations (17) through (19) above. Likewise, using the outputs of the master and slave CORDICs 94 and 96, the control circuitry 76 is enabled to determine the phase error ($\theta_R$) of the receiver front-end 24 based on equations (20) through (22) above.

Figure 6:
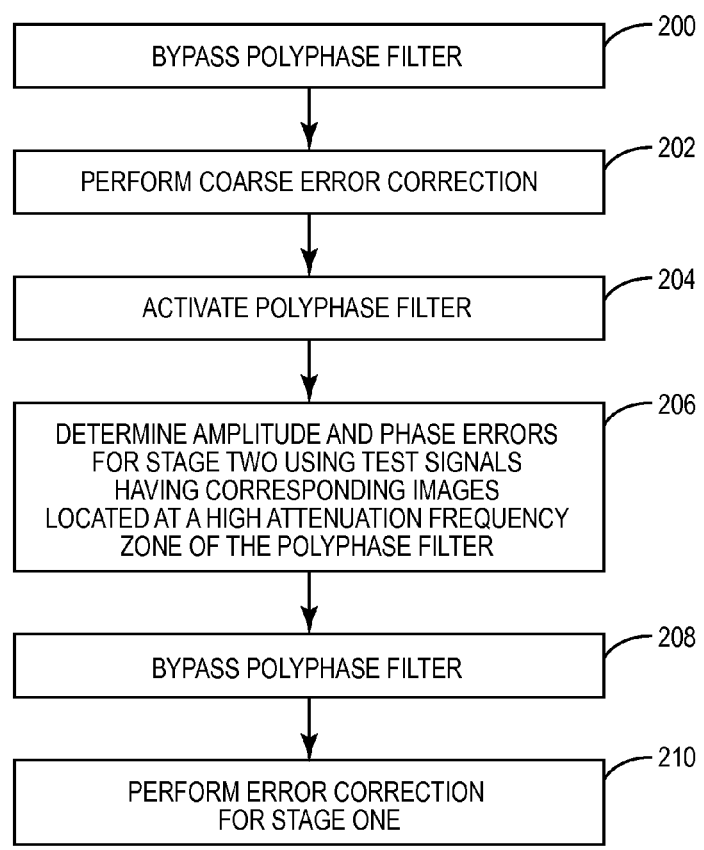
FIGS. 6-9 are flow charts illustrating the operation of the image rejection calibration system of FIG. 2 according to a second embodiment of the present invention.

FIG. 6 is a flow chart illustrating an image rejection calibration process according to another embodiment of the present invention. This embodiment is particularly beneficial for receivers, such as the receiver 22 of FIG. 2, having a polyphase filter separating two stages of the receiver 22 and where the output of the receiver 22 is at an IF or VLIF such that image rejection calibration is also performed at IF or VLIF. The following discussion uses the receiver 22 of FIG. 2 as an example. However, it should be appreciated that this image rejection calibration process may be used for any quadrature receiver having two main stages separated by a polyphase filter.

First, the digital IRC control circuitry 70 sets the polyphase notch filter 32 to a bypass mode (step 200). Next, the IRC system 26 performs coarse error correction (202). Generally, the coarse error correction determines an amplitude and phase error of the receiver front-end 24 with the polyphase notch filter 32 bypassed and applies corresponding correction factors to the first stage 30 of the receiver front-end 24. Note that steps 200 and 202 are optional and may not be needed in some implementations.

Next, the polyphase notch filter 32 is reactivated (i.e., not bypassed) (step 204). While the polyphase notch filter 32 is activated, the IRC system 26 determines an amplitude error and a phase error for the second stage 34 of the receiver front-end 24 using test signals having images located at a high-attenuation frequency zone of the polyphase notch filter 32 (step 206). For the polyphase notch filter 32, the high attenuation frequency zone is the notch of the polyphase notch filter 32. Preferably, the polyphase notch filter 32 attenuates the image of the test signal such that the image is at least 45 dB below the test signal. By using a test signal whose image falls within the high attenuation frequency zone of the polyphase notch filter 32, a substantially ideal quadrature test signal is applied to the input of the second stage 34 of the receiver front-end 24. As a result, the amplitude and phase errors determined by the IRC system 26 during step 206 are estimates of the amplitude and phase errors of the second stage 34 of the receiver front-end 24.

Next, the digital IRC control circuitry 70 sets the polyphase notch filter 32 to the bypass mode (step 208). Then, using the amplitude and phase errors of the second stage 34 of the receiver front-end 24, the IRC system 26 performs error correction for the first stage 30 of the receiver front-end 24 (step 210). Generally, the IRC system 26 determines a total amplitude and phase error for the receiver front-end 24 in the manner described above. The amplitude and phase errors of the second stage 34 of the receiver front-end 24 determined in step 206 are then subtracted from the total amplitude and phase errors of the receiver front-end 24 to determine the amplitude and phase errors of the first stage 30 of the receiver front-end 24. The IRC system 26 then applies correction factors to the first stage 30 of the receiver front-end to correct for the amplitude and phase errors of the first stage 30. In addition, the IRC system 26 may provide either the amplitude and phase errors for the second stage 34 or corresponding correction factors to the digital processor 12 (FIG. 1) for correction of the amplitude and phase errors of the second stage 34.

Figure 7:
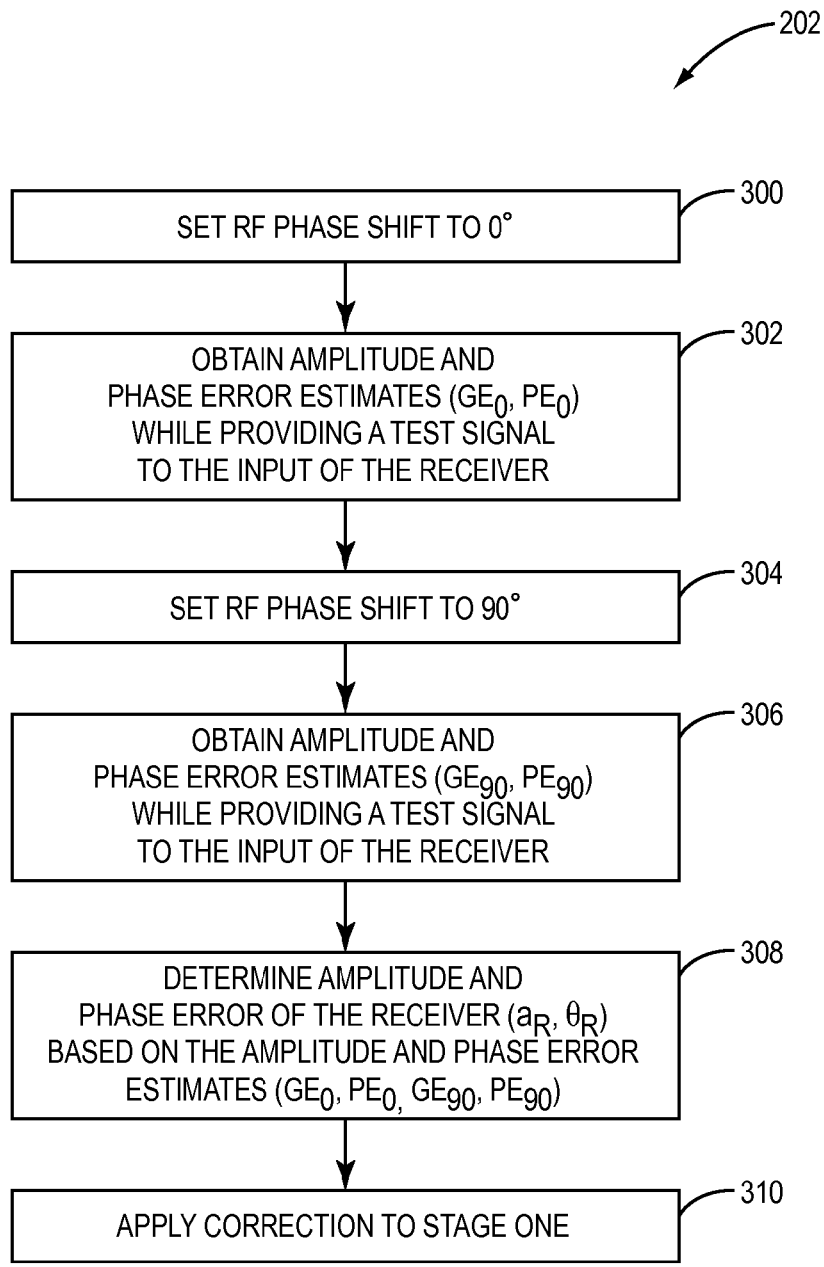

FIG. 7 illustrates step 202 of FIG. 6 in more detail according to one embodiment of the present invention. In order to perform the coarse tuning, the digital IRC control circuitry 70 sets the phase shift of the RF phase shifter 62 to zero degrees (step 300). Again, note that while phase shifts of 0 and 90 degrees are discussed herein, the RF phase shifter 62 may use any two phase shifts that are approximately 90 degrees apart. Next, once the RF phase shift is set to zero degrees, the digital IRC control circuitry 70 obtains a first amplitude (or gain) error estimate ($GE_0$) and a first phase error estimate ($PE_0$) based on measurements of a quadrature output signal ($I_R$, $Q_R$)

output by the receiver front-end 24 while a first test signal is applied to the RF input of the receiver front-end 24 by the IRC modulator 60 and the RF phase shifter 62 (step 302). In this embodiment, the first amplitude error estimate ($GE_0$) is provided using the outputs of the master and slave CORDICs 94 and 96 based on equation (17) above, and the first phase error estimate ($PE_0$) is provided using the outputs of the master and slave CORDICs 94 and 96 using equation (20) above.

The digital IRC control circuitry 70 then sets the phase shift of the RF phase shifter 62 to 90 degrees (step 304). Once the RF phase shift is set to 90 degrees, the digital IRC control circuitry 70 obtains a second amplitude error estimate ($GE_{90}$) and a second phase error estimate ($PE_{90}$) based on measurements of the quadrature output signal ($I_R$, $Q_R$) output by the receiver front-end 24 while a second test signal that is approximately 90 degrees out-of-phase with the first test signal is applied to the RF input of the receiver front-end 24 (step 306). In this embodiment, the second amplitude error estimate ($GE_{90}$) is provided using the outputs of the master and slave CORDICs 94 and 96 based on equation (18) above, and the second phase error estimate ($PE_{90}$) is provided using the outputs of the master and slave CORDICs 94 and 96 using equation (21) above. Based on the first and second amplitude and phase error estimates ($GE_0$, $PE_0$, $GE_{90}$, and $PE_{90}$), the digital IRC control circuitry 70 determines an amplitude error ($a_R$) and a phase error ($\theta_R$) of the receiver front-end 24 (step 308). More specifically, in this embodiment, the amplitude error ($a_R$) is determined using the first and second amplitude error estimates ($GE_0$ and $GE_{90}$) based on equation (19) above. Similarly, the phase error ($\theta_R$) may be determined using the first and second phase error estimates ($PE_0$ and $PE_{90}$) based on equation (22). Once the amplitude error ($a_R$) and the phase error ($\theta_R$) are determined, the digital IRC control circuitry 70 applies corresponding correction factors to the first stage 30 of the receiver front-end 24 (step 310).

Figure 8:
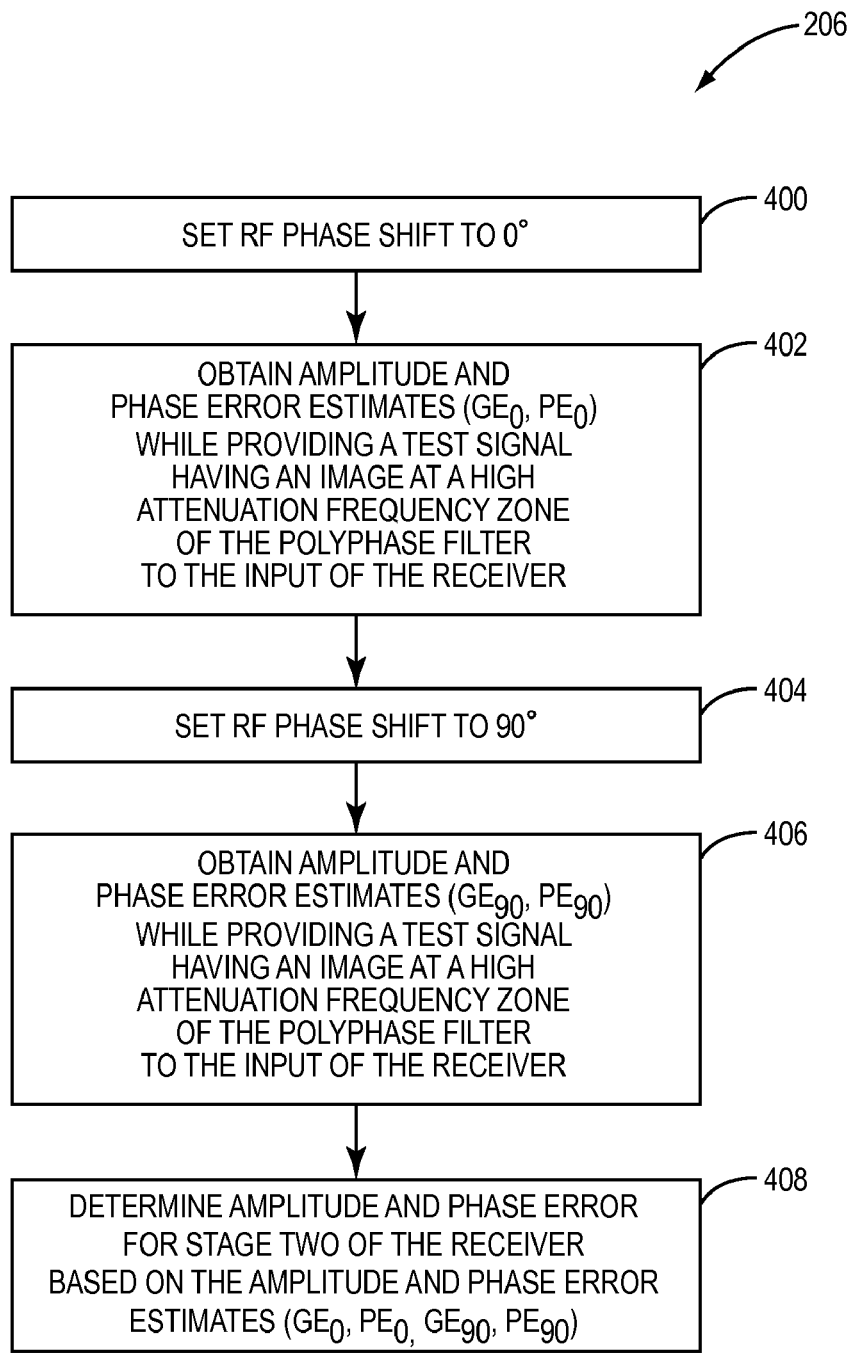

FIG. 8 illustrates step 206 of FIG. 6 in more detail according to one embodiment of the present invention. In order to determine the amplitude error and phase error for the second stage 34 of the receiver front-end 24, first, the digital IRC control circuitry 70 sets the phase shift of the RF phase shifter 62 to 0 degrees (step 400). Again, note that while phase shifts of 0 and 90 degrees are discussed herein, the RF phase shifter 62 may use any two phase shifts that are approximately 90 degrees apart. Once the RF phase shift is set to zero degrees, the digital IRC control circuitry 70 obtains a first amplitude (or gain) error estimate ($GE_0$) and a first phase error estimate ($PE_0$) based on measurements of a quadrature output signal ($I_R$, $Q_R$) output by the receiver front-end 24 while a first test signal is applied to the RF input of the receiver front-end 24 by the IRC modulator 60 and the RF phase shifter 62 (step 402). Recall that the test signals used for step 206 and, if desired, for steps 202 and 208 of FIG. 6 are provided such that the images of the test signals are within a high attenuation frequency zone of the polyphase notch filter 32. In this embodiment, the first amplitude error estimate ($GE_0$) is provided using the outputs of the master and slave CORDICs 94 and 96 based on equation (17) above, and the first phase error estimate ($PE_0$) is provided using the outputs of the master and slave CORDICs 94 and 96 using equation (20) above.

The digital IRC control circuitry 70 then sets the phase shift of the RF phase shifter 62 to 90 degrees (step 404). Once the RF phase shift is set to 90 degrees, the digital IRC control circuitry 70 obtains a second amplitude error estimate ($GE_{90}$) and a second phase error estimate ($PE_{90}$) based on measurements of the quadrature output signal ($I_R$, $Q_R$) output by the receiver front-end 24 while a second test signal that is approximately 90 degrees out-of-phase with the first test signal is applied to the RF input of the receiver front-end 24 (step 406). Again, the test signals used for step 206 and, if desired, for steps 202 and 208 of FIG. 6 are provided such that the images of the test signals are within a high attenuation frequency zone of the polyphase notch filter 32. In this embodiment, the second amplitude error estimate ($GE_{90}$) is provided using the outputs of the master and slave CORDICs 94 and 96 based on equation (18) above, and the second phase error estimate ($PE_{90}$) is provided using the outputs of the master and slave CORDICs 94 and 96 using equation (21) above.

Based on the first and second amplitude and phase error estimates ($GE_0$, $PE_0$, $GE_{90}$, and $PE_{90}$), the digital IRC control circuitry 70 determines an amplitude error ($a_R$) and a phase error ($\theta_R$) of the receiver front-end 24 (step 408). More specifically, in this embodiment, the amplitude error ($a_R$) is determined using the first and second amplitude error estimates ($GE_0$ and $GE_{90}$) based on equation (19) above. Similarly, the phase error ($\theta_R$) may be determined using the first and second phase error estimates ($PE_0$ and $PE_{90}$) based on equation (22). Importantly, since the images of the first and second test signals used for steps 402 and 406 are located within the high attenuation frequency zone of the polyphase notch filter 32, the resulting signals at the input of the second stage 34 of the receiver front-end 24 are substantially ideal quadrature signals. As a result, the amplitude error ($a_R$) and phase error ($\theta_R$) determined in step 408 are substantially the amplitude error and phase error of the second stage 34 of the receiver front-end 24.

Note that step 408 is optional. In some situations, step 408 may not be performed. For example, in one embodiment, the amplitude and phase error estimates ($GE_0$, $GE_{90}$, $PE_0$, and $PE_{90}$) measured in steps 402 and 406 are stored for subsequent use in determining the amplitude and phase errors of the first stage 30 of the receiver front-end 24. In this case, step 408 may not be performed unless, for example, it is also desirable to correct for the amplitude and phase errors of the second stage 34.

Figure 9:
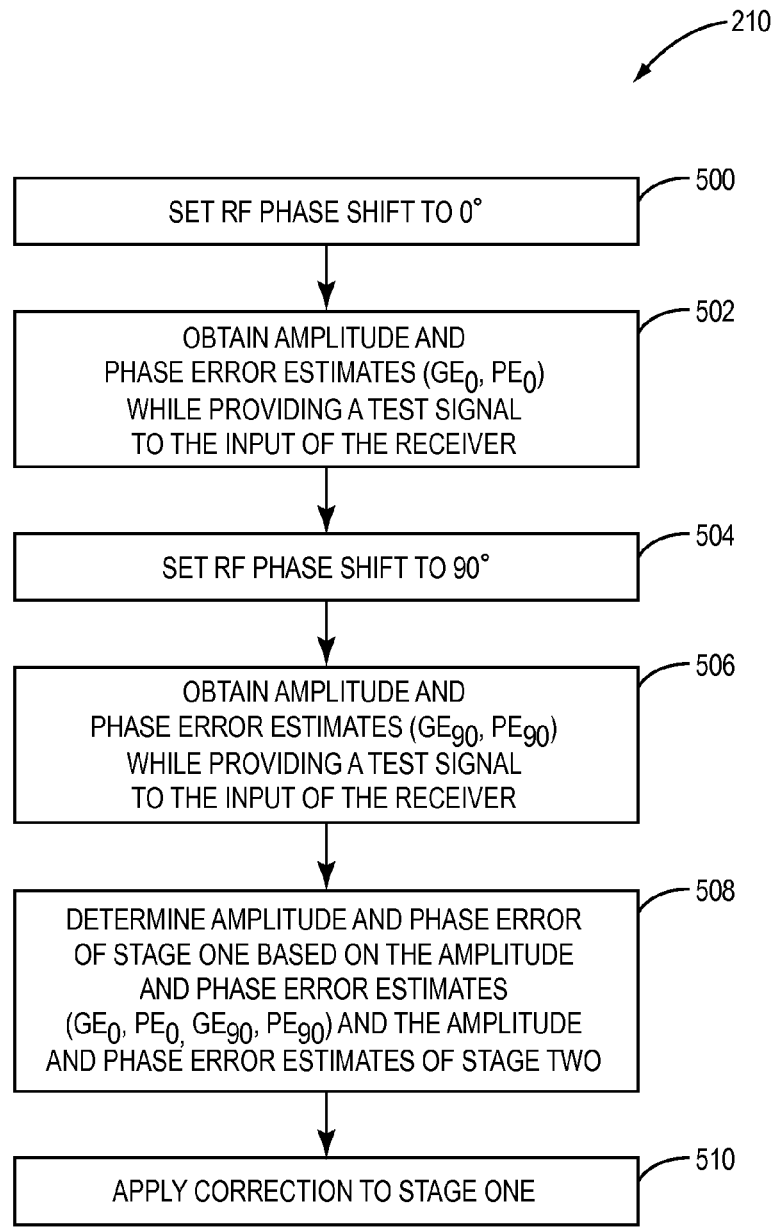

FIG. 9 illustrates step 210 of FIG. 6 in more detailed according to one embodiment of the present invention. In order to determine the amplitude error and phase error for the first stage 30 of the receiver front-end 24, first, the digital IRC control circuitry 70 sets the phase shift of the RF phase shifter 62 to zero degrees (step 500). Note that, as discussed above, the polyphase notch filter 32 is bypassed during step 210 of FIG. 6. Once the RF phase shift is set to zero degrees, the digital IRC control circuitry 70 obtains a first amplitude (or gain) error estimate ($GE_0$) and a first phase error estimate ($PE_0$) based on measurements of a quadrature output signal ($I_R$, $Q_R$) output by the receiver front-end 24 while a first test signal is applied to the RF input of the receiver front-end 24 by the IRC modulator 60 and the RF phase shifter 62 (step 502). In this embodiment, the first amplitude error estimate ($GE_0$) is provided using the outputs of the master and slave CORDICs 94 and 96 based on equation (17) above, and the first phase error estimate ($PE_0$) is provided using the outputs of the master and slave CORDICs 94 and 96 using equation (20) above.

The digital IRC control circuitry 70 then sets the phase shift of the RF phase shifter 62 to 90 degrees (step 504). Once the RF phase shift is set to 90 degrees, the digital IRC control circuitry 70 obtains a second amplitude error estimate ($GE_{90}$) and a second phase error estimate ($PE_{90}$) based on measurements of the quadrature output signal ($I_R$, $Q_R$) output by the receiver front-end 24 while a second test signal that is approximately 90 degrees out-of-phase with the first test signal is applied to the RF input of the receiver front-end 24 (step 506). In this embodiment, the second amplitude error estimate ($GE_{90}$) is provided using the outputs of the master and slave CORDICs 94 and 96 based on equation (18) above, and the second phase error estimate ($PE_{90}$) is provided using the outputs of the master and slave CORDICs 94 and 96 using equation (21) above.

Based on the first and second amplitude and phase error estimates ($GE_0$, $PE_0$, $GE_{90}$, and $PE_{90}$) and, in this embodiment, the first and second amplitude and phase error estimates measured in step 206 (FIG. 6) for the second stage 34 (which are referred to herein at $GE_{0,STAGE2}$, $GE_{90,STAGE2}$, $PE_{0,STAGE2}$, and $PE_{90,STAGE2}$), the digital IRC control circuitry 70 determines an amplitude error ($a_R$) and a phase error ($\theta_R$) of the first stage 30 of the receiver front-end 24 (step 508). More specifically, in this embodiment, the amplitude error ($a_R$) for the first stage 30 is determined based on the equation:

$$a_{R,STAGE1} \cong \frac{(GE_0 + GE_{90}) - (GE_{0,STAGE2} + GE_{90,STAGE2})}{2}.$$

Similarly, the phase error ($\theta_R$) for the first stage 30 of the receiver front-end 24 may be determined based on the equation:

$$\theta_{R,STAGE1} \cong \frac{(PE_0 + PE_{90}) - (PE_{0,STAGE2} + PE_{90,STAGE2})}{2}.$$

Once the amplitude and phase errors for the first stage 30 of the receiver front-end 24 have been determined, the digital IRC control circuitry 70 applies corresponding correction factors to the first stage 30 (step 510). In addition, if desired, the digital IRC control circuitry 70 may apply correction factors for the amplitude and phase errors for the second stage 34 of the receiver front-end 24 in the second stage 34, apply correction factors for the amplitude and phase errors of the second stage 34 to the digital processor 12 (FIG. 1) for correction in the digital processor 12, or provide the amplitude and phase errors of the second stage 34 to the digital processor 12 for correction.

Those skilled in the art will recognize improvements and modifications to the embodiments of the present invention. All such improvements and modifications are considered within the scope of the concepts disclosed herein and the claims that follow.

What is claimed is:

1. A receiver comprising:
a receiver front-end having a radio frequency (RF) input and a quadrature output; and
an image rejection calibration system adapted to:
apply a first test signal to the RF input of the receiver front-end;
obtain first measurements of a quadrature output signal output at the quadrature output of the receiver front-end while the first test signal is applied to the RF input of the receiver front-end;
apply a second test signal that is approximately 90 degrees out-of-phase with the first test signal to the RF input of the receiver front-end;
obtain second measurements of the quadrature output signal output at the quadrature output of the receiver front-end while the second test signal is applied to the RF input of the receiver front-end;
determine an amplitude error and a phase error of the receiver front-end based on the first and second measurements; and
apply an amplitude correction and a phase correction to the receiver front-end to correct for the amplitude error and the phase error of the receiver front-end.

2. The receiver of claim 1 wherein the amplitude error and the phase error determined for the receiver front-end based on the first and second measurements are separate from an amplitude error and a phase error of the image rejection calibration system such that the amplitude correction corrects for the amplitude error of the receiver front-end rather than a combined amplitude error of the receiver front-end and the image rejection calibration system and the phase correction corrects for the phase error of the receiver front-end rather than a combined phase error of the receiver front-end and the image rejection calibration system.

3. The receiver of claim 1 wherein in order to determine the amplitude error and the phase error of the receiver front-end, the image rejection calibration system is further adapted to:
determine a first amplitude error estimate and a first phase error estimate based on the first measurements;
determine a second amplitude error estimate and a second phase error estimate based on the second measurements;
determine the amplitude error based on the first and second amplitude error estimates; and
determine the phase error based on the first and second phase error estimates.

4. The receiver of claim 1 wherein the first measurements comprise a magnitude estimate and a phase estimate for an in-phase component of the quadrature output signal while the first test signal is applied to the RF input and a magnitude estimate and a phase estimate for a quadrature-phase component of the quadrature output signal while the first test signal is applied to the RF input, and the second measurements comprise a magnitude estimate and a phase estimate for the in-phase component of the quadrature output signal while the second test signal is applied to the RF input and a magnitude estimate and a phase estimate for the quadrature-phase component of the quadrature output signal while the second test signal is applied to the RF input.

5. The receiver of claim 4 wherein the image rejection calibration system is further adapted to determine the amplitude error based on the magnitude estimate of the in-phase component for the first test signal, the magnitude estimate of the quadrature-phase component for the first test signal, the magnitude estimate of the in-phase component for the second test signal, and the magnitude estimate of the quadrature-phase component for the second test signal.

6. The receiver of claim 4 wherein the image rejection calibration system is further adapted to determine the amplitude error based on the magnitude estimate of the in-phase component for the first test signal and the magnitude estimate of the quadrature-phase component for the second test signal.

7. The receiver of claim 4 wherein the image rejection calibration system is further adapted to determine the phase error based on the phase estimate of the in-phase component for the first test signal, the phase estimate of the quadrature-phase component for the first test signal, the phase estimate of the in-phase component for the second test signal, and the phase estimate of the quadrature-phase component for the second test signal.

8. The receiver of claim 1 wherein the image rejection calibration system comprises:
a modulator adapted to generate a modulated signal;
an RF phase shifter adapted to apply a first phase shift to the modulated signal to provide the first test signal to the RF input of the receiver front-end when in a first state and apply a second phase shift to the modulated signal to provide the second test signal to the RF input of the receiver front-end when in a second state, the first and second phase shifts being approximately 90 degrees apart; and an image rejection calibration controller adapted to:
control the modulator and the RF phase shifter to apply the first test signal to the RF input of the receiver front-end;
obtain the first measurements of the quadrature output signal output at the quadrature output of the receiver front-end while the first test signal is applied to the RF input of the receiver front-end;
control the modulator and the RF phase shifter to apply the second test signal that is approximately 90 degrees out-of-phase with the first test signal to the RF input of the receiver front-end;
obtain the second measurements of the quadrature output signal output at the quadrature output of the receiver front-end while the second test signal is applied to the RF input of the receiver front-end;
determine the amplitude error and the phase error of the receiver front-end based on the first and second measurements; and
apply the amplitude correction and the phase correction to the receiver front-end to correct for the amplitude error and the phase error of the receiver front-end.

9. The receiver of claim 8 wherein the image rejection calibration controller comprises measurement circuitry coupled to the quadrature output of the receiver front-end and adapted to obtain the first and second measurements.

10. The receiver of claim 1 wherein the receiver front-end comprises:
a first stage having an input corresponding to the RF input of the receiver front-end and an output;
a polyphase filter having an input coupled to the output of the first stage and an output; and
a second stage having an input coupled to the output of the polyphase filter and an output corresponding to the quadrature output of the receiver front-end,
wherein the image rejection calibration system sets the polyphase filter to a bypass mode when applying the first test signal to the RF input and applying the second test signal to the RF input.

11. The receiver of claim 1 wherein a phase difference between the first test signal and the second test signal is 90 degrees plus or minus a phase error of less than or equal to four degrees.

12. A receiver comprising:
receiver front-end having a radio frequency (RF) input and a quadrature output, and comprising:
a first stage having an input corresponding to the RF input of the receiver front-end and an output;
a polyphase filter having an input coupled to the output of the first stage and an output; and
a second stage having an input coupled to the output of the polyphase filter and an output corresponding to the quadrature output of the receiver front-end; and
an image rejection calibration system adapted to:
obtain measurements of a quadrature output signal at the quadrature output of the receiver front-end that are indicative of an amplitude error and a phase error of the second stage of the receiver front-end while applying test signals having images located within a high-impedance frequency zone of the polyphase filter to the RF input of the receiver front-end;
determine an amplitude error and a phase error of the first stage of the receiver front-end based on:
measurements of a quadrature output signal at the quadrature output of the receiver front-end while applying test signals to the RF input of the receiver front-end and bypassing the polyphase filter; and
the measurements indicative of the amplitude error and the phase error of the second stage of the receiver front-end; and
apply an amplitude correction and a phase correction to the first stage of the receiver front-end to correct for the amplitude error and the phase error of the first stage of the receiver front-end.

13. The receiver of claim 12 wherein in order to obtain the measurements indicative of the amplitude error and the phase error of the second stage of the receiver front-end, the image rejection calibration system is further adapted to:
apply a first test signal to the RF input of the receiver front-end, the first test signal having an image at a frequency located within the high-impedance frequency zone of the polyphase filter;
obtain first measurements of the quadrature output signal output at the quadrature output of the receiver front-end while the first test signal is applied to the RF input of the receiver front-end;
apply a second test signal that is approximately 90 degrees out-of-phase with the first test signal to the RF input of the receiver front-end, the second test signal having an image at a frequency located within the high-impedance frequency zone of the polyphase filter; and
obtain second measurements of the quadrature output signal output at the quadrature output of the receiver front-end while the second test signal is applied to the RF input of the receiver front-end,
wherein the first measurements and the second measurements are the measurements indicative of the amplitude error and the phase error of the second stage of the receiver front-end.

14. The receiver of claim 12 wherein in order to determine the amplitude error and the phase error of the first stage of the receiver front-end, the image rejection calibration system is further adapted to:
set the polyphase filter to a bypass mode;
apply a first test signal to the RF input of the receiver front-end;
obtain first measurements of the quadrature output signal output at the quadrature output of the receiver front-end while the first test signal is applied to the RF input of the receiver front-end;
apply a second test signal that is approximately 90 degrees out-of-phase with the first test signal to the RF input of the receiver front-end;
obtain second measurements of the quadrature output signal output at the quadrature output of the receiver front-end while the second test signal is applied to the RF input of the receiver front-end; and
determine the amplitude error and the phase error of the first stage of the receiver front-end based on the first and second measurements and the measurements indicative of the amplitude error and the phase error of the second stage of the receiver front-end.

15. The receiver of claim 12 wherein prior to obtaining the measurements indicative of the amplitude error and the phase error of the second stage, determining the amplitude error and the phase error of the first stage, and applying the amplitude correction and the phase correction to the first stage, the image rejection calibration system is further adapted to perform a coarse amplitude and phase error correction process to provide coarse amplitude and phase error correction in the first stage of the receiver front-end.

16. The receiver of claim 12 wherein the image rejection calibration system is further adapted to determine the amplitude error and the phase error of the second stage of the receiver front-end based on the measurements indicative of the amplitude error and the phase error of the second stage and apply an amplitude correction and a phase correction to correct for the amplitude error and the phase error of the second stage of the receiver front-end.

17. A method of operating an image rejection calibration system to provide image rejection calibration for a receiver front-end of a receiver comprising:
  applying a first test signal to a radio frequency (RF) input of the receiver front-end;
  obtaining first measurements of a quadrature output signal output at a quadrature output of the receiver front-end while the first test signal is applied to the RF input of the receiver front-end;
  applying a second test signal that is approximately 90 degrees out-of-phase with the first test signal to the RF input of the receiver front-end;
  obtaining second measurements of the quadrature output signal output at the quadrature output of the receiver front-end while the second test signal is applied to the RF input of the receiver front-end;
  determining an amplitude error and a phase error of the receiver front-end based on the first and second measurements; and
  applying an amplitude correction and a phase correction to the receiver front-end to correct for the amplitude error and the phase error of the receiver front-end.

18. The method of claim 17 wherein the amplitude error and the phase error determined for the receiver front-end based on the first and second measurements are separate from an amplitude error and a phase error of the image rejection calibration system such that the amplitude correction corrects for the amplitude error of the receiver front-end rather than a combined amplitude error of the receiver front-end and the image rejection calibration system and the phase correction corrects for the phase error of the receiver front-end rather than a combined phase error of the receiver front-end and the image rejection calibration system.

19. A method of operating an image rejection calibration system to provide image rejection calibration for a receiver front-end comprising a first stage having an input corresponding to a radio frequency (RF) input of the receiver front-end and an output, a polyphase filter having an input coupled to the output of the first stage and an output, and a second stage having an input coupled to the output of the polyphase filter and an output corresponding to a quadrature output of the receiver front-end, comprising:
  obtaining measurements of a quadrature output signal at the quadrature output of the receiver front-end that are indicative of an amplitude error and a phase error of the second stage of the receiver front-end while applying test signals having an image located at a frequency within a high-impedance frequency zone of the polyphase filter to the RF input of the receiver front-end;
  determining an amplitude error and a phase error of the first stage of the receiver front-end based on measurements of a quadrature output signal at the quadrature output of the receiver front-end while applying test signals to the RF input of the receiver front-end and bypassing the polyphase filter, and the measurements indicative of the amplitude error and the phase error of the second stage of the receiver front-end; and
  applying an amplitude correction and a phase correction to the first stage of the receiver front-end to correct for the amplitude error and the phase error of the first stage of the receiver front-end.

20. The method of claim 19 wherein obtaining the measurements indicative of the amplitude error and the phase error the second stage of the receiver front-end comprises:
  applying a first test signal to the RF input of the receiver front-end, the first test signal having an image at a frequency located within the high-impedance frequency zone of the polyphase filter;
  obtaining first measurements of the quadrature output signal output at the quadrature output of the receiver front-end while the first test signal is applied to the RF input of the receiver front-end;
  applying a second test signal that is approximately 90 degrees out-of-phase with the first test signal to the RF input of the receiver front-end, the second test signal having an image at a frequency located within the high-impedance frequency zone of the polyphase filter; and
  obtaining second measurements of the quadrature output signal output at the quadrature output of the receiver front-end while the second test signal is applied to the RF input of the receiver front-end,
  wherein the first measurements and the second measurements are the measurements indicative of the amplitude error and the phase error of the second stage of the receiver front-end.

21. The method of claim 19 wherein determining the amplitude error and the phase error of the first stage of the receiver front-end comprises:
  setting the polyphase filter to a bypass mode;
  applying a first test signal to the RF input of the receiver front-end;
  obtaining first measurements of the quadrature output signal output at the quadrature output of the receiver front-end while the first test signal is applied to the RF input of the receiver front-end;
  applying a second test signal that is approximately 90 degrees out-of-phase with the first test signal to the RF input of the receiver front-end;
  obtaining second measurements of the quadrature output signal output at the quadrature output of the receiver front-end while the second test signal is applied to the RF input of the receiver front-end; and
  determining the amplitude error and the phase error of the first stage of the receiver front-end based on the first and second measurements and the measurements indicative of the amplitude error and the phase error of the second stage of the receiver front-end.

* * * * *